Patented Oct. 1, 1940

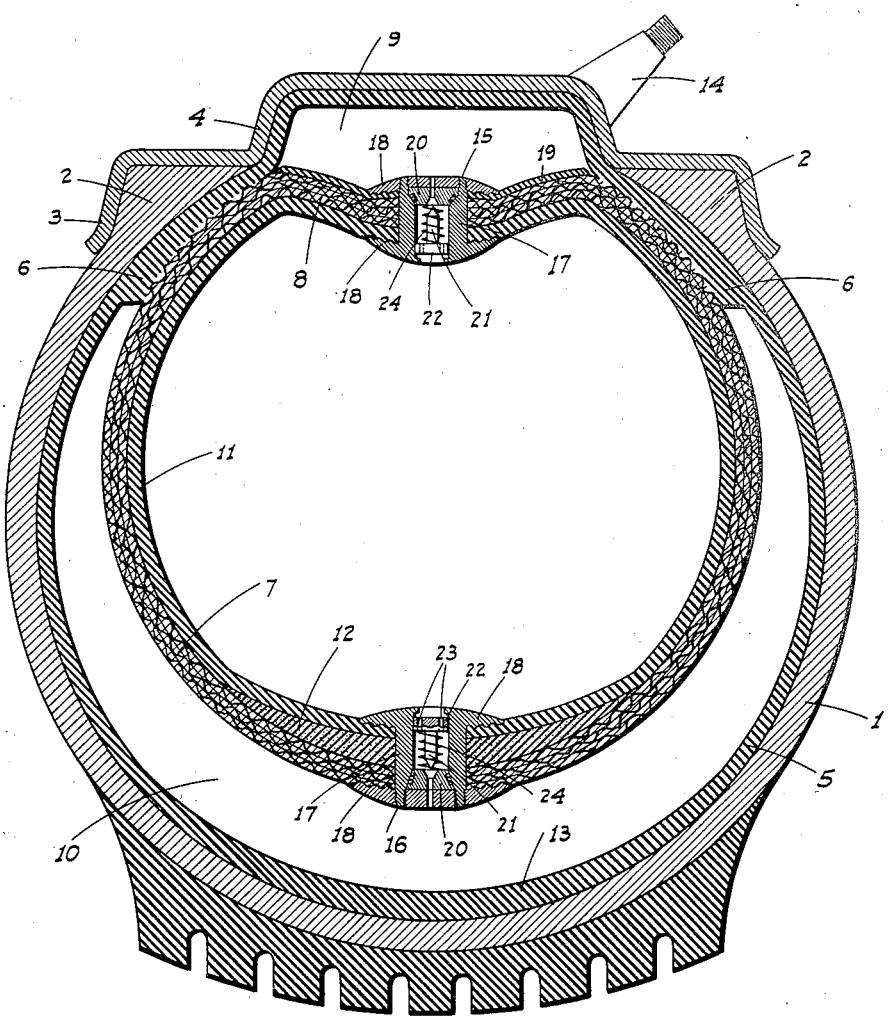

2,216,368

UNITED STATES PATENT OFFICE 2,216,368

PNEUMATIC TIRE

Le Grande Rodney Hollingshead, New Orleans, La., assignor of ten per cent to Granville S. Delamere, Marysville, Calif.

Application February 26, 1937, Serial No. 127,925

7 Claims. (Cl. 152—342)

This invention relates generally to pneumatic tires, and in particular the invention is directed to an improved inflatable tube unit for pneumatic tires.

The principal object of my invention is to provide a multiple tube unit embodying means forming a plurality of concentrically arranged annular air chambers disposed in radially outward relation to each other, and designed so that if one of said chambers is deflated due to a blowout, puncture or the like, the tube unit remains partly inflated and temporarily serviceable whereby to assure convenience and safety.

A further object of the invention is to provide a multiple tube unit as above, arranged so that if one of said annular chambers is deflated, the air pressure remaining in the tube unit will exert a lateral pressure on the beads of the tire casing preventing slipping or creeping of said beads relative to the rim.

Another object of the invention is to provide a multiple tube unit of the type described including one inflatable tube disposed within another inflatable tube; the innermost tube being enveloped by a protective fabric casing whereby, in effect, to form a secondary or inner tire.

It is also an object of this inventiton to provide a multiple tube unit which is so constructed that when disposed in a tire casing, the casing and tube unit assembly can easily be mounted on a drop center rim; the multiple tube unit when subsequently inflated assuring that the tire casing fits the rim snugly.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

The figure on the drawing is a transverse section of a tire and tube unit assembly embodying my invention.

Referring now more particularly to the characters of reference on the drawing, the numeral 1 indicates a main tire casing of conventional form having beads 2 to engage the flanges of a rim 3 formed with a drop center portion 4 as is now a standard practice.

A pneumatic tube 5 is disposed within the casing, and when said tube is inflated, follows the contour of the casing and drop center portion 4 of the rim as shown; the tube 5 being thickened somewhat adjacent the beads and substantially in the plane of the rim flanges as shown at 6.

Within tube 5 is an inner casing 7 formed of multiple ply fabric so as to be non-elastic and substantially circular in form. This casing is of smaller diameter than tube 5, and engages and is secured to the thickened portions 6 of the tube 5. The casing 7 is formed so that between its secured portions, it normally deflects or bows radially out from the rim transversely of the tire, as shown at 8; said bowed portion being spaced from the rim engaging portion of tube 5 forming an annular air chamber 9 therebetween.

Radially out from the secured portions of the tube 5 and inner casing 7, said tube and casing are spaced from each other from side to side, leaving another outer air chamber 10 separate from chamber 9. An air retaining tube 11, following the contour of casing 7 throughout its extent, is disposed within the same.

An inner or secondary tire is thus formed upon which the vehicle can be driven if the main tire becomes deflated, and positive safety from the hazards of blow-outs, as well as rim cuts, and the like, is thus provided.

By reason of the above construction, the inner peripheral diameter of the inner casing is substantially the same as that of the outer casing. This allows the several parts to be in a natural position when the tire is mounted on the rim, while enabling the tire to be easily mounted or dismounted. It further allows the tire to be normally and naturally inflated, so that when inflated the tire cannot creep or slip on the rim. Further, by reason of the bowed portion 8, the still inflated inner tube 11, if chamber 10 is deflated, will exert a lateral pressure against both beads 2 to clamp them on the rim against relative slipping movement. This is because the pressure in the inner tube 11 tends to straighten out said bowed portion 8. Substantially the same result will of course be attained if the chamber 9 becomes deflated.

In order to provide additional safety in the tread zone of the tire, a layer of gum rubber 12 is disposed between casing 7 and tube 11, while the tube 5 is thickened across said zone as indicated at 13.

The tire is inflated through the usual valve stem 14 on tube 5, which leads into chamber 9, the air then passing through a check valve 15 in the secondary tire into tube 11 thereof, and thence to chamber 10 through another check valve 16 in the secondary tire.

These valves are of special construction and are substantial duplicates of each other, valve 15 closing toward chamber 9 and valve 16 closing toward chamber 10. Each valve comprises a tubular body 17 having enlarged end heads 18 to engage and clamp the adjacent portions of the casing 7 and tube 11. The head of valve 15 in chamber 9 is sealed against possible leakage with the fabric casing by a ruber strip 19 on the latter.

The valve seat memer 20 is rubber-sealed in the body, and cooperates with the needle-type valve stem 21, on the outer end of which is a head 22 slidable in the body and having air bleed holes 23 therethrough. A compression spring 24 about the stem engages the head and acts to normally hold the valve unseated or open.

In operation, the valves are normally open during inflation of the tire, the air flowing through holes 23. However, when either chamber 9 or chamber 10 becomes deflated, as by a puncture or blowout, the relatively high pressure in tube 11 acts on the corresponding head 22 to close the valve stem, thus preventing leakage from said tube.

Also, while the tire is rotating, centrifugal force will act on the head 22 of valve 16 to force the same closed, thus preventing leakage from tube 11 in the event that chamber 10 has a small slow leak.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In the combination of a drop center rim having tire bead engaging flanges, a tire mounted on the rim with the beads engaging said flanges, and an inflated multiple tire tube unit in said tire, the unit including one annular tube disposed concentrically within another annular tube, said tubes being spaced apart for the major portion of their circumferential extent transversely, means securing said one tube in air-tight connection with said other tube only at spaced annular junctures on opposite sides of the tubes radially outwardly of the radially innermost portion of said other tube and in the regions laterally adjacent to the tire beads and rim flanges, and means for inflating said tubes.

2. A combination as in claim 1 in which said one tube is reinforced against expansion; and in which the portion of said other tube radially inwardly of said junctures conforms to the drop center of said rim, the corresponding portion of said one tube normally being bowed radially outwardly transversely of the tire.

3. An inflatable fluid container for insertion in and removal from a tire casing as a unit comprising an inner tube substantially inextensible throughout its entire area, an outer flexible tube connected to the inner tube at laterally opposite sides thereof throughout their entire longitudinal dimensions, the inner and outer tube being free of and spaced from each other outwardly of their connected portions and being free of each other at their base portions inwardly of said connected portions, and means for inflating said tubes.

4. In a multiple tire-tube unit including an outer tube and an inner tube, said tubes when inflated being spaced apart for the major portion of their circumferential extent transversely including their radially innermost portions, means securing the inner tube in air tight connection with the outer tube at spaced annular junctures, said junctures being on opposite sides of the tubes and located at the radially outermost termination of said portions whereby an air chamber is formed between said portions.

5. A tube unit as in claim 4, in which the radially innermost portion of the outer tube is expansible while the corresponding portion of the inner tube is inexpansible.

6. In a multiple tire tube unit, an outer tube, an inexpansible inner tube therein, said tubes when inflated being spaced apart for the major portion of their circumferential extent transversely; means securing the inner tube in air tight connection with the outer tube only at spaced annular junctures; said junctures being on opposite sides of the tubes and adjacent but spaced radially out from the radially innermost periphery of the outer tube; the radially inward peripheral portion of the inner tube between said junctures being normally bowed radially outward to allow of limited lateral separation of the portions of the inner tube at said junctures.

7. In a multiple tire tube unit comprising an outer tube and a smaller inner tube, means securing the tubes together at laterally opposed points intermediate the radially innermost and radially outermost peripheries of the outer tube whereby to form annular air chambers in the outer tube radially outward and radially inward of the inner tube, means to supply air to the radially inward chamber and check valves mounted in the inner tube to separately establish communication between the radially inward chamber and the inner tube and between said inner tube and the radially outward chamber, said valves being normally open and closing in a direction away from the inner tube; there being means acting to cause each valve to close upon rapid deflation of the corresponding adjacent chamber.

LE GRANDE RODNEY HOLLINGSHEAD.